(No Model.)

W. T. HAIN.
STOVE PLATE FOR COOKING UTENSILS.

No. 443,518. Patented Dec. 30, 1890.

Witnesses
Ed. A. Kelly
David Levan

Wm. T. Hain, Inventor
By his Attorney

UNITED STATES PATENT OFFICE.

WILLIAM T. HAIN, OF READING, PENNSYLVANIA.

STOVE-PLATE FOR COOKING UTENSILS.

SPECIFICATION forming part of Letters Patent No. 443,518, dated December 30, 1890.

Application filed April 29, 1890. Serial No. 349,884. (No model.)

*To all whom it may concern:*

Be it known that I, WILLIAM T. HAIN, a citizen of the United States, residing at Reading, in the county of Berks, State of Pennsylvania, have invented a certain Stove-Plate for Cooking Utensils, of which the following is a specification.

During the process of cooking the contents of the cooking utensils are ordinarily liable to be scorched, unless carefully watched, by the excessive heat conveyed either from the fire direct or through the metal top of the stove to the bottom of the utensil and thence to its contents. In order to avoid this danger a variety of vessels have been provided with double bottoms inclosing non-combustible materials adapted to prevent the conveyance of an excessive amount of heat. This means of avoiding the trouble, however, necessitates a variety of sizes and forms of utensils to meet the various uses and conditions to which they are adapted, and as these are necessarily more expensive than utensils of ordinary construction, and as the process of cooking in them is moreover apt to be too slow to make their exclusive use satisfactory, they are largely dispensed with, even where their use would be highly advantageous.

My object is to accomplish the same result without necessitating special utensils; and to this end I provide a removable plate or disk inclosing a non-combustible semi-conducting material, such as asbestos, and adapted to be placed upon the stove to serve as a support for an ordinary utensil and to protect it from excessive heat as effectually as would the false bottom already referred to.

The invention is more fully described in connection with the accompanying drawings, and is specifically pointed out in the claim.

Figure 1:
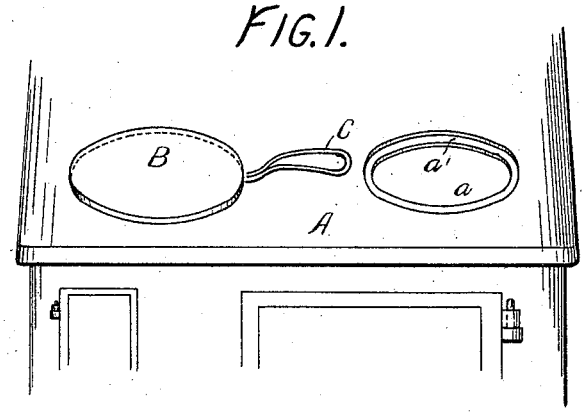
Figure 2:
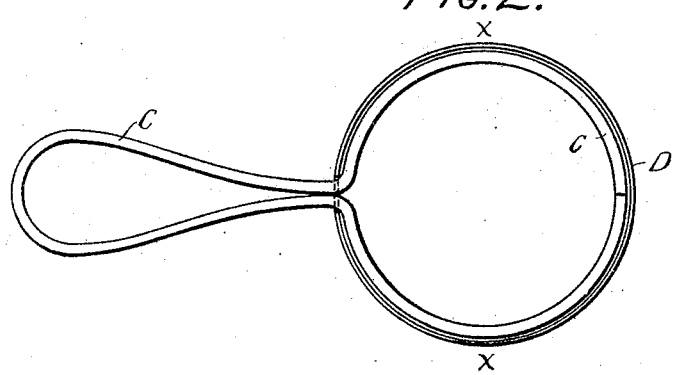
Figure 3:
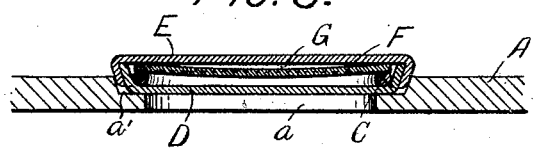

Figure 1 is a perspective view of a portion of a stove-top showing my supporting-plate placed in one of the pot-holes. Fig. 2 is a plan of the lower disk of the plate as I prefer to construct it, separate from the upper disk and the asbestus sheet. Fig. 3 is a cross-section of the complete plate through X X of Fig. 2.

The plate B is made up of disks D and E, formed of sheet metal, as shown, with their edges turned up by spinning or shaping in a die, so as to be united thereby, leaving a space G between them within which is placed a sheet of asbestus F, or other non-combustible material. A handle C is secured to the lower disk D and projects therefrom in convenient shape. It is represented as formed of wire, which is carried around the inner periphery of the disk and upon which the asbestus sheet rests. The upper disk being secured to the lower by spinning or otherwise, all will be firmly united and a light and compact plate formed without any soldering or riveting.

In using my plate it is preferably adapted to rest within a pot-hole of the stove-top A, upon the ledge $a'$, which supports the ordinary lid, but is of such a thickness as to raise its upper surface above the level of the stove-top, thus permitting a vessel having a larger base than the plate B to rest upon it without bringing the projecting portion in contact with the stove. It is evident, however, that instead of fitting within the pot-hole $a$ it may be made large enough to more than cover it, or it may be rested on the ordinary lid or on the stove-top, though (except with an excessively hot fire) it is better to remove the ordinary lid.

I am aware that a lining of non-conducting material has been heretofore applied to the inner or lower surface of the top plate of a cooking-stove to protect it from the intense heat of the fire, and I do not broadly claim such a construction.

What I claim is—

As a new article of manufacture, a supporting and protecting stove-lid for cooking utensils, consisting of upper and lower disks of sheet metal united at their peripheries, a non-combustible material, like asbestus, interposed between said disks, and a wire extending around the inner periphery of said disks and projecting to form a handle, all substantially as and for the purpose set forth.

In testimony whereof I affix my signature in presence of two witnesses.

WILLIAM T. HAIN.

Witnesses:
ED. A. KELLY,
EDMUND SHEETZ.